«12» United States Patent
Cheng et al.

(10) Patent No.: US 6,319,537 B1
(45) Date of Patent: Nov. 20, 2001

(54) STABLE COFFEE CONCENTRATE SYSTEM

(75) Inventors: Pu-Sheng Cheng; Ying Zheng; Serena Laroia, all of Dublin; Wenjie Hu, Marysville; Rachid Rahmani, Columbus, all of OH (US)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/453,932

(22) Filed: May 16, 2000

Related U.S. Application Data

(60) Provisional application No. 60/134,640, filed on May 18, 1999.

(51) Int. Cl.[7] .............................. A23F 5/00; B65D 85/72
(52) U.S. Cl. .......................... 426/594; 426/386; 426/387; 426/388; 426/119; 426/392
(58) Field of Search .................................... 426/594, 386, 426/387, 388, 106, 112, 119

(56) References Cited

U.S. PATENT DOCUMENTS

| 3,810,999 | * | 5/1974 | Balling et al. . | |
|---|---|---|---|---|
| 4,008,340 | | 2/1977 | Kung et al. | 426/651 |
| 5,087,469 | | 2/1992 | Acree | 426/544 |
| 5,182,926 | | 2/1993 | Carns et al. | 62/352 |
| 5,384,143 | | 1/1995 | Koyama et al. | 426/546 |
| 5,688,545 | * | 11/1997 | Sanders . | |
| 5,897,703 | | 4/1999 | Hatakeyama et al. | 106/696 |
| 5,997,929 | | 12/1999 | Heeb et al. | 426/433 |

FOREIGN PATENT DOCUMENTS

| 489401 | * | 6/1992 | (EP) . |
|---|---|---|---|
| 0 861 596 | | 9/1998 | (EP) . |
| 0 893 065 | | 1/1999 | (EP) . |
| 0 934 702 | | 8/1999 | (EP) . |
| 2057894 | | 4/1981 | (GB) . |

* cited by examiner

Primary Examiner—Anthony Weier
(74) Attorney, Agent, or Firm—Winston & Strawn

(57) ABSTRACT

A beverage system that contains a coffee base concentrate and coffee aroma for providing a coffee beverage. The coffee base concentrate has a soluble coffee solids concentration of at least 10% by weight and is free of coffee aroma. The coffee base concentrate and the coffee aroma are stored separately and are combined upon reconstitution for providing a coffee beverage. Separate store of the coffee base concentrate and the coffee aroma increases the stability of the system. The coffee base concentrate and/or aroma components may be further treated to improve stability, including for example adding alkali, and/or treating the coffee base concentrate to remove acid precursors, and/or protecting one or both components from oxygen, and/or storing one or both components at reduced temperature.

22 Claims, No Drawings

STABLE COFFEE CONCENTRATE SYSTEM

CROSS-REFERENCE TO RELATED APPLICATIONS

Continuity Data

This application claims benefit of provisional application Ser. No. 60/134,640 of May 18, 1999.

STATEMENT REGARDING FEDERALLY SPONSORED RESEARCH

Not Applicable

REFERENCE TO A MICROFICHE APPENDIX

Not Applicable

FIELD OF THE INVENTION

This invention relates to a beverage system containing a stable coffee concentrate and coffee aroma. The stable coffee concentrate and coffee aroma are stored separately and may be reconstituted to provide an aromatized coffee beverage. The invention also relates to a method for providing the beverage system.

BACKGROUND OF THE INVENTION

Coffee products which are in a form convenient for the consumer, are commonly available as soluble beverage powders and ready-to-drink liquid beverages.

Coffee products in the form of soluble beverage powders may be of extremely high quality; to the point were they provide a beverage very similar to freshly brewed beverages. Despite this, they are still perceived as being inferior to freshly brewed coffee. Also, the fact that soluble beverage powders are in powder form creates problems in many food service applications where the product is dispensed from a machine. In particular, problems such as mechanical degradation of the powder, bridging, and blocking occur.

Ready-to-drink liquid coffee beverages are very popular in Asian markets. The beverages are made up of soluble coffee solids, stabilizers, water and, usually, sugar. For whitened beverages, a creamer or whitener may be included. Ordinarily, these beverages have a soluble coffee solids concentration of about 1% by weight. These beverages are very often consumed cold and, in general, have organoleptic properties which are different than freshly brewed coffee. Therefore they do not and in fact are not intended to, provide a substitute to freshly brewed coffee.

There have also been attempts to provide convenient coffee products in fluid concentrate form. In theory, a coffee concentrate offers the advantages of being perceived to have better quality than soluble beverage powders, and being simple to apply in food service applications. Unfortunately, liquid coffee concentrates are unstable and this has severely limited their application. One problem appears to be the increase of acidity over time which negatively influences the quality of the beverage reconstituted from the coffee concentrate. Also, curdling of whitener or creamer components may occur.

Attempts have been made to avoid or reduce the acidity increase by adding base to the concentrate. For example, European patent application 0861596 describes treating a coffee concentrate with alkali to convert acid precursors to their acid salts, and then neutralizing the treated concentrate with acid to bring the pH to about 4.7 to 5.3. This process is described to convert the acid precursors to stable salts and hence prevent the formation of acid during storage.

Another possible method of avoiding or reducing the acidity increase in aromatized coffee concentrates is to increase concentration to above about 55%. This is described in European patent application 0893065.

These processes provide some improvement of the storage stability of the coffee concentrates, but quality deterioration still occurs. Therefore there is still a need for a stable coffee concentrate that overcomes these problems.

SUMMARY OF THE INVENTION

Accordingly, this invention provides a beverage system for providing a coffee beverage, the beverage system which includes a coffee base concentrate having a soluble coffee solids concentration of at least about 10% by weight and from which coffee aroma has been removed, and coffee aroma separate from the coffee base concentrate. The coffee base concentrate and coffee aroma are combinable upon reconstitution for providing a coffee beverage.

It has been surprisingly found that separation of the coffee base concentrate and coffee aroma significantly improves stability. The coffee base concentrate and coffee aroma may be each stored in a separate container or may be stored in separate compartments of a single container. The containers are preferably dispenser containers.

In another aspect, this invention provides a beverage system for providing a coffee beverage, the beverage system comprising a container including a first storage compartment containing a coffee base concentrate having a soluble coffee solids concentration of at least 10% by weight and from which coffee aroma has been removed, and a second storage compartment containing coffee aroma. Advantageously, a system for providing water at the correct temperature may be included.

Preferably, the soluble coffee solids concentration of the coffee base concentrate is at least about 50% by weight; for example about 50% to about 65% by weight.

In another aspect, this invention provides a method for improving the storage stability of a coffee concentrate, the method comprising separately storing a coffee base concentrate having a soluble coffee solids concentration of at least 10% by weight and from which coffee aroma has been removed; and coffee aroma.

BRIEF DESCRIPTION OF THE SEVERAL VIEWS OF THE DRAWINGS

Not Applicable

DETAILED DESCRIPTION OF THE INVENTION

Embodiments of the invention are described by way of example only. This invention is based upon the finding that the separate storage of concentrated soluble coffee solids and coffee aroma significantly improves the stability of the concentrated soluble coffee solids. Therefore, by separately storing the coffee base concentrate and coffee aroma and recombining them upon reconstitution, a coffee beverage of good quality may be provided.

The coffee base concentrate may be obtained using any suitable procedure since the exact procedure used is not critical. Usually, the coffee base concentrate is prepared by concentrating a coffee extract obtained from a coffee extraction process to the desired coffee concentration. The coffee extract may be produced in the usual manner by subjecting roasted coffee beans to extraction. Any suitable extraction procedure may be used because the choice and design of the extraction procedure is a matter of preference and has no critical impact on the invention. Suitable extraction procedures are described in U.S. Pat. Nos. 5,997,929 and 5,897,903, the disclosures of which are incorporated by reference. Similarly, any suitable concentration procedure may be used because the choice and design of the concentration procedure is a matter of preference and has no critical impact on the invention. Of course, the coffee base concentrate may also be prepared by dissolving soluble coffee powder in water to the desired concentration.

The concentration of the coffee base concentrate is at least about 10% by weight, for example at least 30% by weight. Preferably the concentration is high enough such that the concentrate will not support the growth of microorganism, for example about 50% to about 65% by weight. The concentration may be more than 65% by weight but then dispensing becomes more difficult due to increasing viscosity.

The coffee base concentrate may be treated to account for or reduce the formation of acids during storage. To account for the formation of acids during storage, the pH of the coffee base concentrate may be raised about 0.5 to 1.0 unit higher than original pH. The pH will still fall during storage but the coffee base concentrate will not become too acidic during acceptable shelf life times. The pH may be raised using any suitable procedure. For example, an alkali may be added to the coffee base concentrate to raise the pH. Suitable alkalis include sodium hydroxide, calcium hydroxide, potassium hydroxide and sodium bicarbonate.

Alternatively, the pH may be raised using ion exchange process with an ion exchange resins. This offers the advantage that the no additives are added to the coffee base concentrate. Alternatively, a combination of adding alkali and ion exchange can of course be performed. It is preferred that the coffee base concentrate is obtained from extract subjected to ion exchange treatment to raise pH.

It may be advantageous to store coffee base concentrate in a refrigerated or frozen condition, preferably frozen. This has the advantage that the stability of coffee base concentrate may be improved.

The formation of acids may be reduced or prevented by inducing hydrolysis of the acid precursors in the coffee base concentrate. This may be done by raising the pH to cause the acid precursors to form stable salts and then reducing the pH of the concentrate. This may be done by adding alkali as described in European patent application 0861596 or by using ion exchange. Usually the pH will be raised to above about 9. The pH may again be lowered to a normal coffee pH range using suitable acids or ion exchange. Alternatively, the acid precursors may be thermally hydrolyzed or enzymatically hydrolyzed, for example by using an esterase.

The formation of acids may also be reduced or prevented by removing acid precursors from the coffee base concentrate using membrane fractionation process. It is preferred that the coffee base concentrate is obtained from extract subjected to membrane fractionation. Suitable membranes are commercially available.

It is also possible to add an alkali to the base coffee concentrate at the time of reconstitution of the beverage. This may be done by dispensing an alkali along with the base coffee concentrate.

The coffee base concentrate should be substantially free of coffee aroma. Processing the roasted coffee beans to a coffee base concentrate, as described above, will result in the loss of substantially all coffee aroma from the coffee base concentrate. However, it is preferred to specifically strip off and then collect the coffee aroma during processing. In this way, the coffee aroma is separated from the concentrate but is not lost. Processes for stripping off and collecting the coffee aroma are well known. Usually coffee aroma is stripped off at one or more stages; for example using an inert gas during, or immediately after, grinding of the coffee beans, and using steam to strip coffee aroma from the coffee extract during extraction.

Alternatively, the fresh coffee grounds may be slurried in water or coffee extract and the coffee aroma stripped from the slurry. A suitable procedure is described in U.S. application Ser. No. 09/057,741, the disclosure of which is incorporated by reference.

The coffee aroma may be captured using any suitable procedure. Ordinarily, the coffee aroma is captured by condensing from the carrier gas it in one or more condensers. Preferably more than one condenser is used; each succeeding condenser being operated at a lower temperature than the previous condenser. If necessary or desired, one of the condensers may be a cryogenic aroma condenser. A suitable cryogenic aroma condenser is described in U.S. Pat. No. 5,182,926, the disclosure of which is incorporated by reference. The captured coffee aroma may, if desired, be concentrated using a suitable technique such as partial condensation or rectification.

The captured coffee aroma may be combined with a suitable carrier substrate such as coffee oil or an emulsion containing coffee oil.

The processes for the production of the coffee extract and capture of the coffee aroma may be carried out under oxygen reduced or oxygen free conditions if desired. This may be accomplished as is known in the art; for example by carrying out the processes under a blanket of inert gas. Further, deoxygenated water may be used whenever water is necessary in the process.

The coffee aroma is preferably stored under oxygen reduced or oxygen free conditions. Similarly, the coffee base concentrate may stored under oxygen reduced or oxygen free conditions. Further, if desired, oxygen scavengers may be added to the coffee aroma and/or coffee base concentrate. Suitable oxygen scavengers are described in U.S. application Ser. No. 09/018,566, the disclosure of which is incorporated by reference. If further desired, coffee aroma can be stored under refrigerated or frozen condition. This has the advantage that the stability of the aroma may be improved.

For food service applications, the coffee base concentrate and the coffee aroma may be separately stored in suitable dispenser containers. The containers may be separate for the coffee base concentrate and the coffee aroma or a single container having separate storage chambers may be used. The containers are suitably pouches made from barrier films which are able to keep water vapor, oxygen and light transmission to a minimum. Suitable barrier films are commercially available; for example polyester/aluminum/polyethylene barrier films.

For retail applications, the coffee base concentrate and the coffee aroma are preferably packaged in suitable containers which have separate storage chambers for the coffee base concentrate and the coffee aroma. Suitable containers include multi-compartment stick packs; sachets; carton-based, tetrahedron packs; Unifill packs; squeezeable plastic bottles; stand up pouches; plastic cups; etc. The containers are preferably designed such that opening of the container opens both chambers such that both the coffee base concentrate and the coffee aroma are simultaneously available for reconstitution of the beverage.

[Section] [s1]

EXAMPLES

The following examples illustrate preferred embodiments of the invention.

Example 1

Roast and ground coffee was fed into a slurry tank along with a coffee extract containing about 8 to 10% by weight of soluble coffee solids. The resulting slurry was fed to the top of a disc and donut stripping column using a slurry pump. Steam at a low pressure of less than about 20 kPa (gauge) was fed into the bottom of the stripping column. The stripping rate was 50% by weight of steam compared to roast and ground coffee.

The aromatized gas stream leaving the stripping column was subjected to concentration by rectification in a packed rectification column. The liquid condensing in the rectification condenser was collected and comprises about 10% by weight of the roast and ground coffee. The coffee aroma was placed in glass vials and protected from oxygen.

The stripped slurry leaving the stripping column was then subjected to extraction in a continuous extraction system made up of three extraction reactors and two solubilization reactors. The system is as described in U.S. Pat. No. 5,897,903, which has been incorporated by reference. The extraction reactors are operated at 120° C., 110° C., and 110° C., respectively. The solubilization reactors are operated at 1.75 MPa for 5 minutes and 1.75 MPa for 8 minutes respectively. The water used in the extraction system was deoxygenated and an inert blank was used with the system to reduce oxygen ingress.

The extract obtained is called stripped extract. This stripped extract was further concentrated using a evaporation system to provide a coffee base concentrate containing about 55% by weight of soluble coffee solids. About 0.75% to 1% of sodium hydroxide (by weight relative to coffee solids) was added to the coffee base concentrate. This amount of Sodium hydroxide was sufficient to neutralize acid formation over a period of 6 months. The coffee base concentrate was then filled in glass vials and held under inert gas conditions.

Three sample groups were prepared for storage. For the control group, coffee base concentrate was combined with coffee aroma at a level of about 10% coffee aroma and frozen at −40° C. The coffee base concentrate and coffee aroma were protected from oxygen during the process.

The prior art formulation was made by combining coffee base concentrate with coffee aroma at a level of about 10% coffee aroma and filled into glass vials. The coffee base concentrate and coffee aroma were protected from oxygen during the process.

For Example 1, the coffee base concentrate and coffee aroma were separately stored in the glass vials. The vials of the prior art formulation and Example 1 were stored at 20° C. under an inert gas for up to 6 months.

A coffee beverage was prepared from each sample group over the period of the storage trial and evaluated by a panel using the "Difference from Control" sensory evaluation method. When preparing beverages of Example 1, about 10% by weight coffee aroma was added to the base coffee concentrate. Each of the storage samples was evaluated against to the frozen control. Each panelist gives a score between 1 and 10 to indicated the degree of difference. If the score is 9 and 10, this means that the panelist could not tell the storage sample as being different from frozen control. If the score is between 6 to 8, a difference from frozen control is detected but the difference is acceptable. If the score is below 6, the difference between the storage sample and the frozen control is not acceptable. If a score below 9 is given, each panelist is asked to describe the differences under the following attributes: cloudiness, coffeeness, roastyness, pruneyness/molasses, acidity, bitterness and body. Panelists are also free to use other attributes to describe the differences. At the end of evaluation, the panel give a consensus score for the samples being evaluated.

The beverages prepared from the samples of Example 1 scored values of 6 to 8 during the trial. After six month storage, the differences are (1) less coffeeness, (2) less roastyness and (3) some development of green, woody characteristics. However, the differences are acceptable. The beverages prepared from the prior art formulation scored values of less than 6 and were not acceptable.

Example 2

The process of Example 1 was repeated except that, instead of adding sodium hydroxide to the coffee base concentrate, the stripped extract was subjected to membrane fractionation process, specifically ultra-filtration, using a membrane with a 3.5K molecular cut off such that about 25% of coffee solids was removed in the permeate. It is preferred to membrane fractionate the stripped extract to prevent loss of aroma during processing. And then the retentate was further evaporated to form coffee base concentrate. The coffee base concentrate and coffee aroma were separately stored in the glass vials. The beverages prepared from the coffee base concentrate and coffee aroma of Example 2 scored values of 6 to 8 during the trial.

Example 3

The process of Example 1 was repeated except that, instead of adding Sodium hydroxide to the coffee base concentrate, the stripped extract was passed through an ion exchange column containing Dowex 22 resins to raise the pH to a value equivalent to the addition of 1% Sodium hydroxide (by weight relative to coffee solid). It is preferred to use stripped extract to minimize the damage of coffee aroma during processing. The treated stripped extract was further evaporated to form coffee base concentrate. The coffee base concentrate and coffee aroma were separately stored in the glass vials. The beverages prepared from the coffee base concentrate and coffee aroma scored values of 6 to 8 during the trial.

Example 4

The process of Example 1 was repeated except that the coffee aroma was stored under frozen condition. The beverages prepared from the coffee base concent rate and the frozen stored coffee aroma scored values of 6 to 8 during the trial.

Example 5

The coffee base concentrate and the coffee aroma of Example 1 were each inoculated with a microbial cocktail containing 32 yeast, 22 mold and 15 lactic acid bacteria strains. The samples were stored at 20° C. No growth was detected and all organisms had ceased to be viable after two weeks or longer.

While the foregoing description represents the preferred embodiments of the present invention, it will be understood that various additions and/or substitutions may be made therein without departing from the spirit and scope of the present invention. One skilled in the art will appreciate that the invention may be used with many modifications of structure, forms, arrangement, proportions, materials, and components used in the practice of the invention and which are particularly adapted to specific environments and operative requirements, without departing from the principles of the present invention. The presently disclosed embodiments are therefore to be considered in all respects as illustrative and not restrictive.

Deposit of Computer Program Listings

Not Applicable

What is claimed is:

1. A beverage system for providing a coffee beverage, the beverage system comprising:
   a coffee base concentrate having a soluble coffee solids concentration of at least 10% by weight and from which coffee aroma has been removed; and
   coffee aroma separated and isolated from the coffee base concentrate; wherein the coffee base concentrate and coffee are combinable upon reconstitution for providing a coffee beverage.

2. The beverage system of claim 1 wherein the coffee base concentrate has a soluble coffee solids concentration of about 50% to about 65% by weight.

3. The beverage system of claim 1 wherein the coffee base concentrate further comprises an alkali.

4. The beverage system of claim 1 wherein the coffee base concentrate was subjected to ion exchange treatment to raise pH.

5. The beverage system of claim 1 wherein the coffee base concentrate was subjected to membrane fractionation for removal of acid precursors.

6. The beverage system of claim 1 wherein the coffee aroma further comprises an oxygen scavenger.

7. The beverage system of claim 1 wherein the coffee base concentrate further comprises an oxygen scavenger.

8. The beverage system of claim 1 wherein the coffee aroma, the coffee base concentrate, or both are stored under refrigerated condition.

9. The beverage system of claim 1 wherein the coffee base concentrate is stored under frozen condition.

10. The beverage system of claim 1 wherein the coffee aroma is stored under frozen condition.

11. The beverage system of claim 1 wherein the coffee base concentrate and coffee aroma are each stored in a separate dispenser container.

12. A beverage system according to claim 11 in which each container is a pouch comprising barrier films.

13. A beverage system for providing a coffee beverage system comprising a container including:
    a first storage compartment containing a coffee base concentrate having a soluble coffee solids concentrate of at least 10% by weight and from which coffee aroma has been removed; and
    a second storage compartment containing coffee aroma separated and isolated from the first compartment;
    wherein the coffee base concentrate and coffee aroma are combinable upon reconstitution for providing a coffee beverage.

14. The beverage system of claim 13 wherein the coffee base concentrate has a soluble coffee solids concentration of about 50% to about 65% by weight.

15. The beverage system of claim 13 wherein the coffee base concentrate includes an alkali.

16. The beverage system of claim 13 wherein the coffee base concentrate subjected to ion exchange treatment to raise pH.

17. The beverage system of claim 13 wherein the coffee base concentrate was subjected to membrane fractionation for removal of acid precursors.

18. The beverage system of claim 13 wherein the coffee aroma includes an oxygen scavenger.

19. The beverage system of claim 13 wherein the coffee base concentrate includes an oxygen scavenger.

20. The beverage system of claim 13 wherein the storage compartment is a pouch comprising barrier films.

21. A method for improving the storage stability of a coffee concentrate, the method comprising:
    providing and storing a coffee base concentrate having a soluble coffee solids concentration of at least 10% by weight and from which coffee aroma has been removed; and providing and storing coffee aroma, wherein the coffee aroma is stored separately and is isolated from the coffee base concentrate;
    wherein the coffee base concentrate and coffee aroma are combinable upon reconstitution for providing a coffee beverage.

22. The method of claim 21 wherein the coffee base concentrate is produced from coffee, wherein the coffee is concentrated and the aroma is stripped from the coffee base concentrate, and wherein the aroma stripped from the coffee base concentrate is recovered by one or more condensers adapted to recover aroma.

* * * * *

UNITED STATES PATENT AND TRADEMARK OFFICE
CERTIFICATE OF CORRECTION

PATENT NO.      : 6,319,537 B1
DATED           : November 20, 2001
INVENTOR(S)     : Cheng et al.

It is certified that error appears in the above-identified patent and that said Letters Patent is hereby corrected as shown below:

<u>Column 7,</u>
Line 19, after "coffee" insert -- aroma --.

Signed and Sealed this

Twenty-fourth Day of December, 2002

JAMES E. ROGAN
*Director of the United States Patent and Trademark Office*